(12) United States Patent
Venter et al.

(10) Patent No.: US 7,785,386 B2
(45) Date of Patent: Aug. 31, 2010

(54) TREATMENT OF ORGANIC MATTER SLUDGES

(75) Inventors: Hendrik J. Venter, Pretoria (ZA); Carl Nieuwmeijer, Centurion (ZA)

(73) Assignee: Capensis Investments 497 (Proprietary) Limited, Pretoria (ZA)

( * ) Notice: Subject to any disclaimer, the term of this patent is extended or adjusted under 35 U.S.C. 154(b) by 140 days.

(21) Appl. No.: 11/917,523

(22) PCT Filed: Jul. 14, 2006

(86) PCT No.: PCT/IB2006/052408
§ 371 (c)(1),
(2), (4) Date: Dec. 14, 2007

(87) PCT Pub. No.: WO2007/007299
PCT Pub. Date: Jan. 18, 2007

(65) Prior Publication Data
US 2009/0084148 A1    Apr. 2, 2009

(30) Foreign Application Priority Data
Jul. 14, 2005    (ZA)    .................................... 05/5677

(51) Int. Cl.
*C05F 7/00*     (2006.01)
*C05F 3/00*     (2006.01)
*C02F 1/66*     (2006.01)
*C02F 1/00*     (2006.01)
*C05F 11/00*    (2006.01)
*C05F 5/00*     (2006.01)
*C05F 3/02*     (2006.01)

(52) U.S. Cl. .............................. 71/11; 34/102; 34/318; 71/12; 71/13; 71/15; 71/21; 71/22; 71/25; 210/749; 210/764; 210/770; 422/28

(58) Field of Classification Search ......... 210/749–763, 210/702–719; 71/11–24; 34/102, 318; 422/28
See application file for complete search history.

(56) References Cited

U.S. PATENT DOCUMENTS

| | | | | |
|---|---|---|---|---|
| 4,761,893 A | * | 8/1988 | Glorioso | 34/379 |
| 5,318,184 A | * | 6/1994 | Krebs | 209/21 |
| 5,443,613 A | * | 8/1995 | Robinson | 71/12 |
| 6,398,840 B1 | | 6/2002 | Orta-Castro | |

OTHER PUBLICATIONS

International Preliminary Examining Authority, International Search Report, Oct. 23, 2007 4 pgs.

* cited by examiner

*Primary Examiner*—Wayne Langel
*Assistant Examiner*—Syed Iqbal
(74) *Attorney, Agent, or Firm*—Wood, Herron & Evans, L.L.P.

(57) ABSTRACT

A process for treating an organic matter sludge includes, in a mixing stage, mixing an organic matter sludge and particulate sterilized organic matter, to form an organic matter mixture. This mixture is dried in a drying stage to obtain a homogeneous particulate organic product.

10 Claims, 1 Drawing Sheet

TREATMENT OF ORGANIC MATTER SLUDGES

Figure 1:
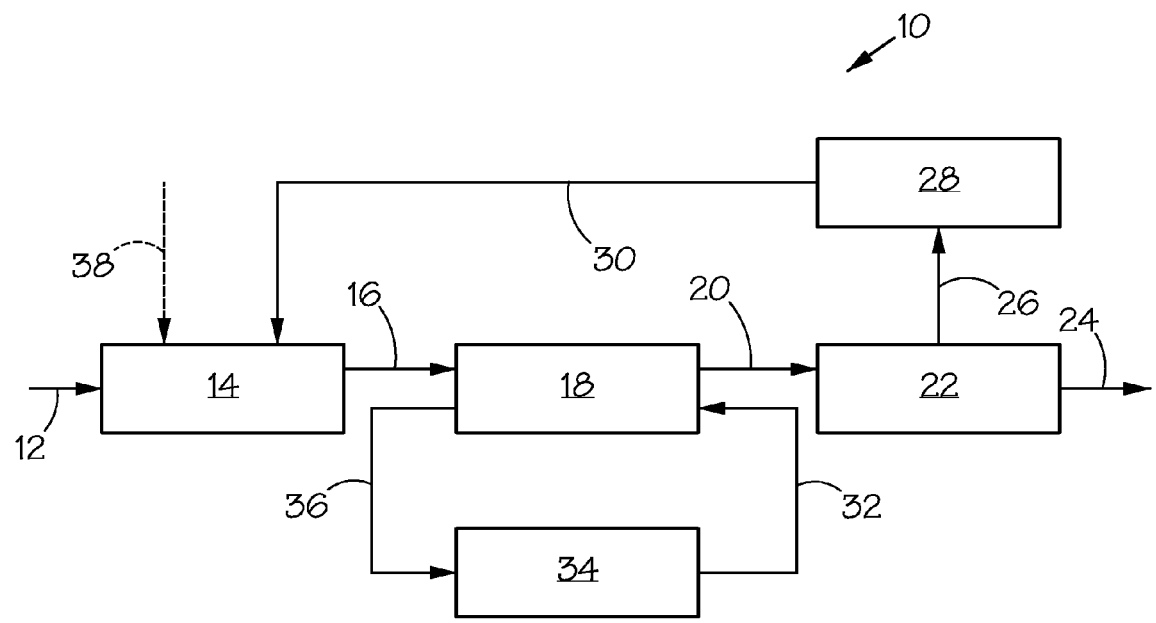

THIS INVENTION relates to the treatment of organic matter sludges. In particular, it relates to a process for treating an organic matter sludge, and to the production of particulate sterilized organic matter, suitable for use in the process.

According to a first aspect of the invention, there is provided a process for treating an organic matter sludge, which process includes in a mixing stage, mixing an organic matter sludge and particulate sterilized organic matter, to form an organic matter mixture; and in a drying stage, drying the organic matter mixture to obtain a homogeneous particulate organic product.

The organic matter sludge may be a liquid or sludge-like organic fertilizer. The organic fertilizer may be an enriched sterilized disinfected sludge.

In one embodiment of the invention, the organic fertilizer or enriched sterilized disinfected sludge may be that obtained by the process of ZA 89/6160, which is hence incorporated herein by reference. Thus, it may be that obtained by introducing anhydrous ammonia gas into raw, activated or digested sewage sludge containing from 2% to 50%, typically 2% to 25%, by mass of solid waste material, to form a sewage sludge intermediate; adding a sufficient quantity of the anhydrous ammonia gas to raise the pH of the sewage sludge to about 11.6 and the temperature of the sludge by between 30° C. and 60° C., and allowing the ammonia to react with the sewage sludge intermediate for at least 5 minutes, typically at least 11 minutes; and adding a sufficient quantity of an inorganic acid capable of reacting exothermically with the ammonia and/or an ammonium complex/intermediate formed in the sewage sludge to neutralize the ammonia, and hence the intermediate, to a pH of about 7, and to raise the temperature of the intermediate to at least 65° C., with the amount of acid used being less than that required to react stoichiometrically with the ammonia gas added thereto. The ammonia thus acts as a sterilizing and disinfecting agent.

However, instead, sludge of any other suitable organic material can be used. For example, the organic matter may be paper-based in which case the sludge is paper pulp; or it can be liquid animal, eg pig, manure.

In principle, any suitable particulate sterilized organic matter can be used. Thus, in one embodiment of the invention, the particulate sterilized organic matter may be homogeneous granulated organic product. In other words, some of the homogeneous granulated organic product is then recycled and mixed with the sludge. The sterilized organic matter is thus in the form of particles of dry solid matter.

However, in another embodiment of the invention, the particulate sterilized organic material may instead, or additionally, particularly for start-up conditions, be that obtained by drying a suitable sterilized organic matter sludge, and comminuting the resultant dried organic matter to obtain the particulate sterilized organic matter. The organic matter can then be sewage; however, instead, any other suitable organic matter can be used, such as paper so that the sludge is in the form of paper pulp; animal, eg pig, manure; or the like. The sterilized organic matter sludge is preferably pH balanced, and may be that obtained by adding a sterilizing agent to raw organic matter sludge. The drying of the sludge may be effected in a solar drying bed, and the drying may be effected for a period of from 2 days to 6 months, depending on the weather conditions and the surface area of the bed. The dried organic matter may be comminuted, eg by passing it through a mill.

It is believed that the particles of the particulate sterilized organic matter act as nuclei for coagulating and flocculating the sludge which thus coats the nuclei when the components are mixed, and that the sterilizing agent which is present could assist, either directly or indirectly, i.e. as an intermediate, in the coagulation and flocculation. The mixing ensures that the components are evenly and homogeneously blended before being subjected to the drying.

The organic matter sludge may typically have a solids content of 16% to 30% on a mass basis. The mass ratio of organic matter sludge to particulate sterilized organic matter may be from 1:1 to 7:3.

The mixing stage may comprise any suitable mixer, which may thus be a normal mixer or a high shear mixer. The retention time of the organic matter sludge and the particulate sterilized organic matter in the mixer may be from 5 seconds to 2 minutes. The retention time may depend on, inter alia, the proportion of sludge to particulate organic matter.

The drying stage may comprise any suitable dryer such as a rotary drum dryer, a fluidized bed dryer, or a spray dryer. In one embodiment of the invention, the drying may be effected in a rotary drum dryer through which air, as a drying agent, passes counter-currently relative to the mixture. However, instead, the air and the mixture can pass through the dryer cocurrently.

The drying temperature, for example the temperature of the hot air that is used in the rotary drum dryer, should not exceed 90° C., and preferably must not exceed 75° C., so that the intrinsic biological value of the product is not compromised. Thus, the air temperature, when air is used as the drying agent, may be from 50° C. to 75° C., and its relative humidity may be from 5% to 0.05% (by mass).

The homogeneous organic product is thus in the form of solid particles, and is suitable for use as a fertilizer.

According to a second aspect of the invention, there is provided a process for producing particulate sterilized organic matter, which process includes adding a sterilizing agent to an organic matter sludge, to form sterilized organic matter sludge;

drying the sterilized organic matter sludge, to obtain dried sterilized organic matter; and comminuting the dried organic matter to obtain the particulate sterilized organic matter.

The particulate sterilized organic matter thus obtained is suitable for use in the process according to the first aspect of the invention.

The sterilizing agent, the addition thereof to the sludge, the drying of the sludge and the comminution of the dried organic matter may be as hereinbefore described.

Figure 2:
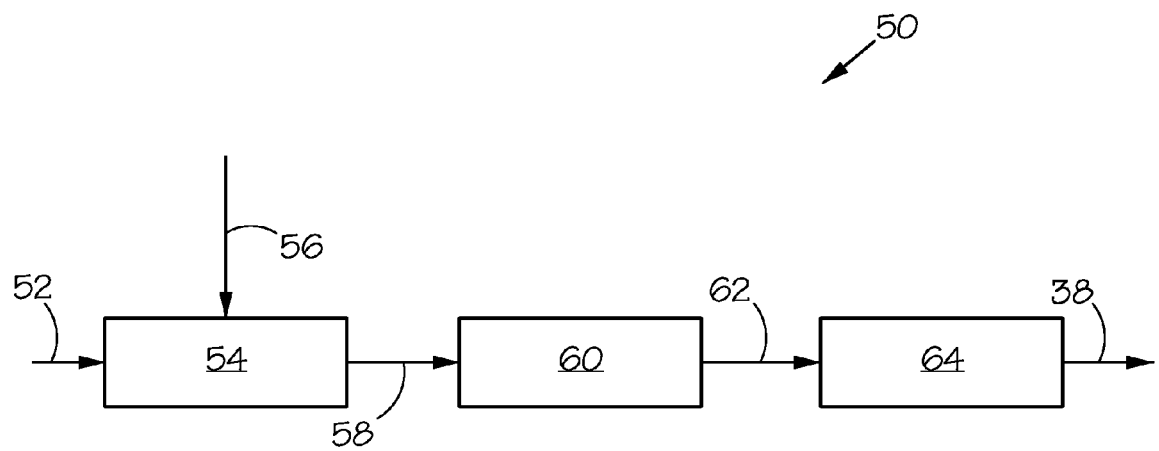

The invention will now be described in more detail with reference to the accompanying diagrammatic drawings, in which FIG. 1 shows, in simplified block diagram form, a process according to the invention, for treating an organic fertilizer; and FIG. 2 shows, in simplified flow diagram form, a process for producing particulate sterilized organic matter, suitable for use in the process of FIG. 1.

Referring to FIG. 1, reference numeral 10 generally indicates a process according to the invention for treating an organic fertilizer in liquid or sludge form. The process 10 includes an organic fertilizer flow line 12 leading into a mixer 14. A flow line 16 leads from the mixer 14 to a rotary drum dryer 18, with a particulate organic product withdrawal line 20 leading from the drum 18.

The flow line 20 leads into a sieving and sorting stage 22, with a product withdrawal line 24 leading from the stage 22.

A product recycle line 26 leads from the stage 22 to a mill 28, with a line 30 leading from the mill 28 to the mixer 14.

A hot air line 32 leads from a heating source 34, eg a heat pump system, into the dryer 18, with a spent air line 36 leading from the dryer back to the heat pump system.

Organic fertilizer is treated in the process 10. The organic fertilizer is in liquid or sludge form.

The organic fertilizer can be enriched sterilized disinfected sludge, such as that produced by a process in accordance with ZA 89/6160 which is hence incorporated herein by reference. Thus, in one embodiment of the invention, the organic fertilizer may be that obtained by thickening sewage sludge from a solids concentration of 0.01-5% (by mass) to a solids content of about 15% (by mass); treating the thickened sewage sludge in a pipe reactor at a pressure of 1-3 bar (g) by the addition thereto, with intimate admixture, of sufficient gaseous ammonia to raise its pH to about 11.6 and with the sludge temperature rising by about 40° C., optionally followed by the addition, after the sludge has reacted with the ammonia for about 10 minutes, of a sterilizing agent such as hydrogen peroxide or ozone, followed by the addition thereto, with intimate admixture, of sufficient phosphoric acid to neutralize the ammonia in the slurry so that its pH is about 7, and with the sludge temperature rising, through exothermic reaction between the ammonia and the phosphoric acid, to at least 65° C.-70° C., to obtain enriched sterilized disinfected sludge or organic fertilizer; and optionally, adding a nutrient such as a nitrate to the organic fertilizer.

In use, the organic fertilizer, which is thus in the form of a sludge or liquid, enters the mixer 14 along the flow line 12. The organic fertilizer has a solids content of about 25% to 30% by mass. In the mixer 14, the organic fertilizer is mixed with homogenized granulated organic product which is recycled to the mixer along the flow line 26, the mill 28 and the flow line 30. The mass ratio of organic fertilizer to recycled organic product is typically 6:4. The retention time in the mixer 14 is typically about 10 to 20 seconds.

In the mixer 14, the recycled homogenized granulated organic product, which is thus in the form of substantially solid particles, acts as nuclei for the organic fertilizer, with the organic fertilizer covering the organic product particles. The organic matter particles thus act as nuclei for coagulating and flocculating the organic fertilizer, as hereinbefore described. The mixer ensures that the components are evenly and homogeneously blended.

The resultant mixture passes along the flow line 16 to the rotary dryer 18 where it is contacted counter-currently with hot air, entering along the line 32, and which is at a temperature of about 65° C. to 75° C. and a relative humidity of about 2% to 0.5%. Spent air is withdrawn from the dryer 18 along the line 36 and reheated in the heat source 34, which is typically a heat pump system.

The mixture entering the dryer 18 typically has a moisture content of about 40% to 50% on a mass basis.

An organic product that is homogenized, i.e. that has a homogeneous composition, and that is in particulate or granulated form, is produced in the dryer 18, and this passes, along the flow line 20, to the sieving and sorting stage 22. It will be appreciated that, due to the use of the drum dryer 18, the particles are rounded and conditioned, thereby facilitating sieving and sorting thereof.

Correctly sized product particles, ranging in size from 3 mm to 5 mm, are withdrawn along the flow line 24 and can be bagged, stored and marketed as an organic fertilizer.

Undersized product particles, ie particles smaller than about 3 mm, are withdrawn along the line 26, as are oversized product particles, ie particles larger than about 5 mm. The oversized particles pass through the mill 28 where they are milled down, typically to a size of about 0.5 mm to 0.05 mm, whereafter they are recycled to the mixer 14 where they act as nuclei as hereinbefore described. Naturally, the undersized particles that are withdrawn from the sieving and sorting stage 22 need not pass through the mill 28 but instead pass directly to the mixer 14.

It is believed that the particulate product that is recycled to the mixer 14, apart from containing a sterilizing agent (ammonia) that assists in coagulating and flocculating the organic fertilizer, also has intrinsic chemical/biological components that make it a suitable mixing agent to assist in forming granules in the dryer 18. Thus, it is possible to feed a mixture, containing a higher than expected moisture content, into the dryer 18 without increasing the likelihood of the mixture sticking to the wall of the dryer, and thus producing an enriched or value-added final product suitable for use as a dry particulate fertilizer.

If desired, during start-up or normal operation, additional extraneous particulate sterilized organic matter can be added to the mixer 14 along a line 38 as indicated in dotted line. This particulate sterilized organic matter thus forms part of the total particulate sterilized organic matter that is added to the sludge in the mixer 14.

The extraneous particulate sterilized organic matter thus used, can be that obtained by the process 50 as indicated in FIG. 2.

The process 50 includes a raw organic matter sludge line 52 leading into a mixing stage 54 into which also leads a sterilizing agent addition line 56. A sterilized organic matter transfer line 58 leads from the mixer 54 to a solar drying bed 60. A withdrawal line 62 leads from the dryer 60 to a mill 64 from which leads the particulate sterilizer organic matter line 38.

In use, raw organic matter sludge, eg raw sewage sludge, paper pulp, a sludge of pig manure and water or the like is introduced into the mixer 54 along the line 52. Sufficient sterilizing agent such as ammonia and inorganic acid is introduced, along the line 56, into the mixer 54 in order to sterilize the sludge. The sterilized sludge passes along the line 58 to the solar drying bed 60 where it is subjected to solar drying for a period of typically about 10 weeks. When the water component of the sludge has substantially evaporated so that a residual dry product remains, the dried product is passed into the mill 64 where it is milled into appropriately sized, typically 0.5 mm to 0.05 mm, particulate sterilized organic matter that is then fed into the mixer 14.

It was thus unexpectedly found that the process 10 provides a particularly effective manner of dewatering and granulating liquid organic fertilizer, ie of converting liquid organic fertilizer into solid particulate organic fertilizer. In particular, by adding the dry solid particles or nuclei to the organic matter sludge, the water content of the sludge is reduced and extreme viscosities, which are usually reached when sludges are dried and which lead to clogging of the drying equipment used, are thereby largely avoided.

The invention claimed is:

1. A process for producing a homogenous particulate organic product from a thickened organic matter sludge, which process comprises:

in a treatment state, treating a thickened organic matter sludge successively with ammonia and an inorganic acid, the ammonia causing an increase in the pH of the sludge and the inorganic acid causing a decrease in the pH of the sludge, to form an enriched sludge;

in a mixing stage, mixing the enriched sludge and particulate sterilized organic matter to form an organic matter mixture; and in a drying stage, drying the organic matter mixture to obtain a homogeneous particulate organic product, the mass ratio between the enriched sludge and the particulate sterilized organic matter being between 1:1 and 7:3 so that the water content of the mixture is lower than the water content of the enriched sludge, the particulate sterilized organic matter acting as a nucleating agent which aids in the granulation of the enriched sludge, the least some of the particulate sterilized organic matter being in the form of recycled comminuted homogeneous particulate organic product.

2. The process as claimed in claim 1, in which the thickened organic matter sludge is an organic fertilizer.

3. The process as claimed in claim 1, in which the thickened organic matter sludge is sewage sludge, paper pulp or liquid animal manure.

4. The process as claimed in claim 1, in which the inorganic acid is phosphoric acid.

5. The process as claimed in claim 1, in which the thickened organic matter sludge has a solids content of 16% to 30% on a mass basis prior to the treating step.

6. The process as claimed in claim 1, in which the mass ratio between the enriched sludge and the particulate sterilized organic material is 6:4.

7. The process as claimed in claim 1, in which the mixing stage comprises a mixer, with the retention time of the enriched sludge and the particulate sterilized organic matter in the mixer being from five seconds to two minutes.

8. The process claimed in claim 1, in which the drying stage comprises a dryer, and with the drying temperature not exceeding 90° C.

9. The process as claimed in claim 8, in which the drying temperature does not exceed 75° C.

10. The process as claimed in claim 8, in which the dryer is a rotary drum dryer into which is fed warm air which serves to dry the organic matter mixture, with the warm air having an inlet air temperature of from 50° C. to 75° C. and a relative humidity from 5% to 0.05% (by mass).

* * * * *